US005087167A

United States Patent [19]

Johnston

[11] Patent Number: 5,087,167

[45] Date of Patent: Feb. 11, 1992

[54] LIFTING SHOE ASSEMBLY FOR USE ON SHEET LIFTERS

[75] Inventor: Richard H. Johnston, Harrison Township, Allegheny County, Pa.

[73] Assignee: Allegheny Ludlum Corporation, Pittsburgh, Pa.

[21] Appl. No.: 571,001

[22] Filed: Oct. 9, 1990

Related U.S. Application Data

[63] Continuation of Ser. No. 356,737, May 25, 1989, abandoned.

[51] Int. Cl.[5] .................... B60P 1/50

[52] U.S. Cl. .................... 414/668; 414/458; 414/722; 414/785

[58] Field of Search .................... 414/458, 626, 663, 664, 414/665, 666, 667, 668, 670, 671, 685, 722, 723, 785

[56] References Cited

U.S. PATENT DOCUMENTS

| | | | |
|---|---|---|---|
| 2,668,602 | 2/1954 | Cushman | 414/785 X |
| 2,801,876 | 8/1957 | Palmer | 414/458 X |
| 2,847,138 | 8/1958 | Backofen et al. | 414/785 |
| 2,975,924 | 3/1961 | Kopanski | 414/785 |
| 2,992,751 | 7/1961 | Quayle | 414/668 |
| 3,356,241 | 12/1967 | Varilek | 414/785 X |
| 3,381,836 | 5/1968 | Ulinski | 414/668 |
| 3,414,087 | 12/1968 | Schmiesing | 414/458 X |
| 3,528,579 | 9/1970 | Ulinski | 414/668 |
| 3,528,580 | 9/1970 | Carliss | 414/785 |
| 4,002,256 | 1/1977 | Kroboth | 414/785 |
| 4,280,781 | 7/1981 | Bodin | 414/785 X |
| 4,297,068 | 10/1981 | Concha et al. | 414/458 |
| 4,355,947 | 10/1982 | Wiblin | 414/664 X |
| 4,362,458 | 12/1982 | Jantzi | 414/458 |
| 4,491,452 | 1/1985 | Matovich | 414/458 X |
| 4,688,982 | 8/1987 | Smart | 414/671 X |
| 4,903,418 | 2/1990 | Loudon | 414/722 |

FOREIGN PATENT DOCUMENTS

| | | | |
|---|---|---|---|
| 0708468 | 4/1965 | Canada | 414/785 |
| 0280796 | 7/1988 | European Pat. Off. | 414/785 |
| 1205449 | 11/1965 | Fed. Rep. of Germany | 414/785 |
| 1168509 | 12/1958 | France | 414/785 |
| 1318517 | 6/1987 | U.S.S.R. | 414/785 |
| 2099787 | 12/1982 | United Kingdom | 414/664 |

*Primary Examiner*—Frank E. Werner
*Assistant Examiner*—James Eller
*Attorney, Agent, or Firm*—Patrick J. Viccaro

[57] ABSTRACT

An adjustable lifting shoe assembly for sheet or sheet package lifting devices is disclosed. The assembly enables a plurality of lifting shoes suspended from a reinforced back plate to be slid laterally along the back plate to stradle and/or be inserted between full-width cross runners or circumferential bands extending beneath the sheet or sheet package. Such a construction is generally suspended from a crane or hoist and is useful in lifting all types of sheet packages.

3 Claims, 2 Drawing Sheets

LIFTING SHOE ASSEMBLY FOR USE ON SHEET LIFTERS

This is a continuation of application Ser. No. 356,737, filed May 25, 1989, now abandoned.

BACKGROUND OF THE INVENTION

1. Field of the Invention

The present invention relates to lifting devices, in general, and to a lifting shoe system for sheet lifting equipment, in particular.

2. Description of the Prior Art

A lifting device, commonly referred to as a sheet lifter, sheet package lifter or sheet grab, is widely used in the steel, other metals, glass and transportation industries. Such a device is usually suspended from an overhead crane or hoist and is used to hook, raise and transport material which is usually positioned horizontally, and either single or multi-stocked, such as sheets of metal, glass, paper, etc. Such material further can be either palletized or non-palletized.

In operation, the lifter is positioned above the sheet or sheet package (commonly referred as the "lift") and then lowered so that the lifting shoes of the lifter can be run under the edge of the lift. Sheet lifters have been proven to be the best and safest devices to handle and transport sheet packages. However, because the lifting shoes of sheet lifters are of a fixed design (i.e. no lateral adjustment), a typical lifter cannot be used universally on all types of sheet packages.

The present lifting shoe component of a sheet lifter is usually fabricated from a continuous, elongated, one-piece angle member. Such solid, continuous lifting shoes are used on most sheet lifters; however, they prohibit the use of the lifter on packages having full-width cross runners extending therebeneath, and on packages having longitudinal runners therebeneath and bounded by circumferential bands. The full-width cross runners prohibit such a shoe from being inserted under the package. And, in the case of packages having longitudinal runners and circumferential bands, it is possible to insert the solid continuous lifting shoe under skids previously placed beneath the circumferential bands. However, when the package is lifted, the shoe of the sheet lifter snaps all of the circumferential bands.

In an effort to increase the utilization and flexibility of sheet lifters, a few manufactures have cut notches in their lifting shoes to allow the shoes to straddle the full width cross runners and under-runner circumferential bands. However, because of various length packages, it is often the case that the full-width cross runners and under-runner circumferential bands cannot be so located so as to enable the notches in the lifting shoe to straddle these obstructions.

It is therefore an object of the present invention to provide a lifting shoe system for sheet lifting devices which is universally adaptable to lift all types of sheet packages, including packages having full-width cross runners or under-runner circumferential bands.

It is a further object of the invention to provide an adjustable lifting shoe system for sheet lifting devices.

It is a further object of the invention to provide a system for sheet lifting devices wherein the lifting shoe system is formed of a plurality of adjustable shoe members or forks.

Still other objects and advantages will become apparent when one considers the attached drawings and the description of the invention presented hereinbelow.

SUMMARY OF THE INVENTION

To overcome the problems encountered with sheet lifters having lifting shoes formed as continuous, solid, elongated, one-piece angle members, there is provided an adjustable lifting shoe system formed as a plurality of laterally adjustable lifting shoes. This system enables the shoes, which are suspended from a reinforced back plate that is usually secured to an overhead hoist or crane, to be slid laterally along the back plate to lift sheet packages having lifting obstacles such as full-width cross runners and/or under-runner circumferential bands. The shoes are slid to suitable locations along the back plate wherein they can be inserted between and/or straddle the package lifting obstacles. With the ability to adjust the shoes in relation to the full-width cross runners and the circumferential bands, sheet package lifters can be fully utilized and adapted to lift all types of sheet packages. Such an adjustable lifting shoe system can be used on the common parallelogram and telescopic type lifters or any such related lifter.

DESCRIPTION OF THE PREFERRED EMBODIMENT

Figure 1:
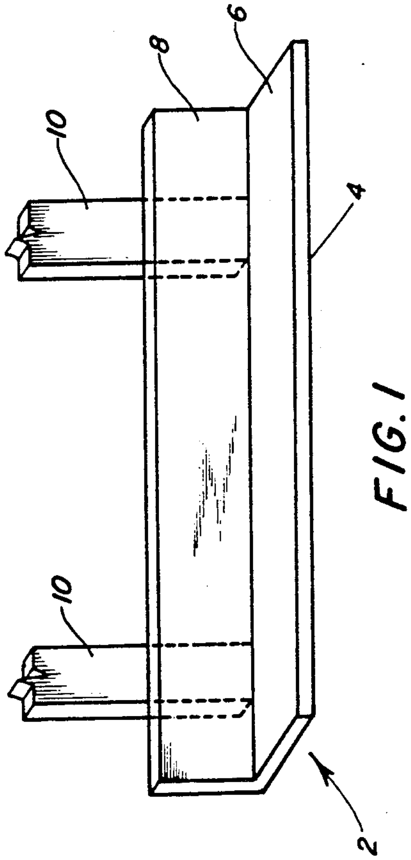
FIG. 1 (PRIOR ART)
FIG. 1 is a perspective view of a prior art lifting shoe for a sheet lifting device.

In FIG. 1 there is depicted a lifting shoe assembly 2 for a typical prior art sheet lifter device. It is to be understood that while only one such device is illustrated, in operation, there are in fact two such devices used to lift and transport a sheet or sheet package, i.e., one on each side of the sheet or sheet package to be lifted and transported.

Figure 5:
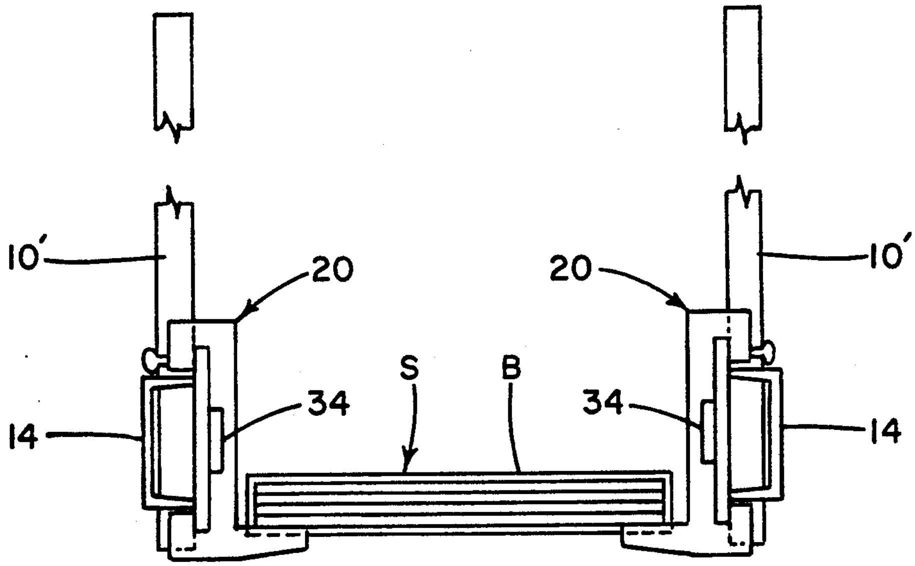
FIG. 5 is an end elevational view of a sheet lifter device constructed in accordance with the present invention.
Figure 6:
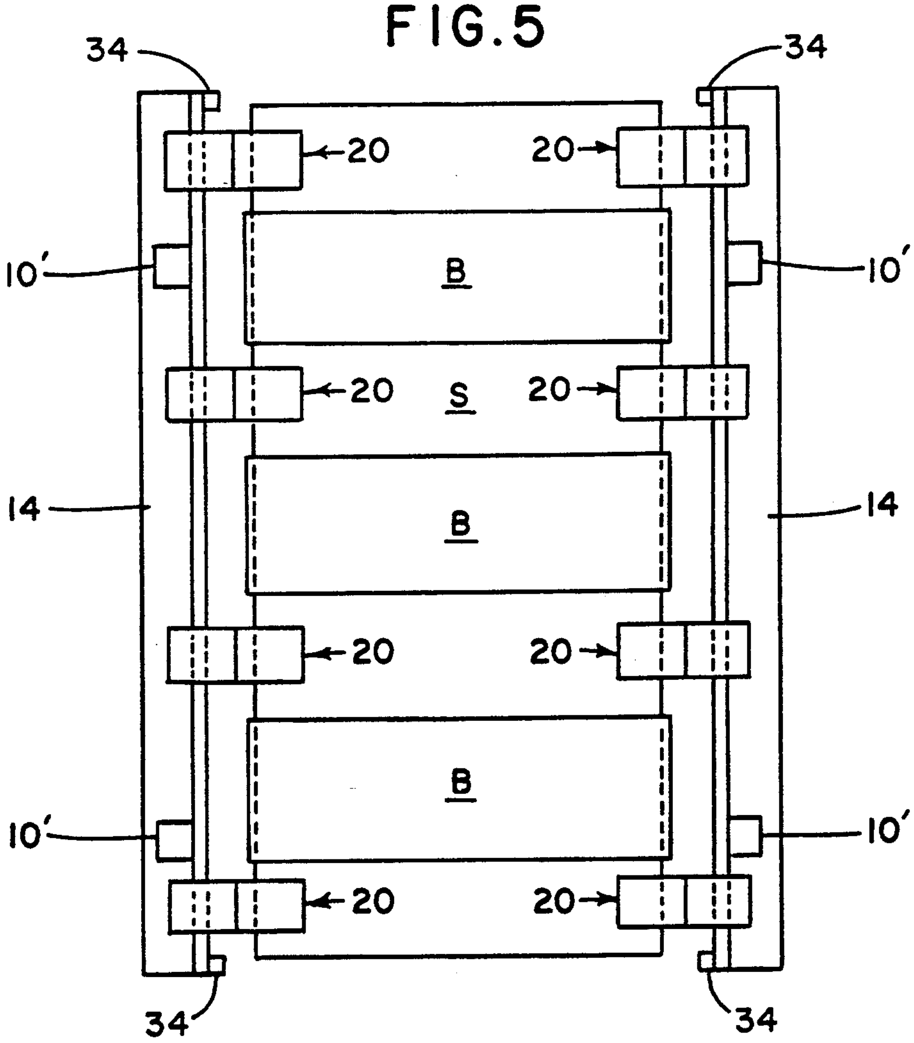
FIG. 6 is a bottom view of the sheet lifter device shown in FIG. 5.

FIGS. 5 and 6 depict such an arrangement using a pair of opposed sheet lifter devices constructed in accordance with the present invention which are suspended from a lifting element of an overhead hoist or crane and which are described in greater detail hereinbelow.

The lifting shoe assembly 2 includes a lifting shoe 4. Lifting shoe 4 is typically fabricated from an elongated, continuous one-piece angle member forming a substantially horizontal sheet package support surface 6 and a substantially vertical rear wall surface 8. Sheet package support surface 6 and wall surface 8 may alternatively be formed from two separate members which are subsequently fastened to one another to form an elongated integral lifting shoe 4. Lifting shoe 4 is fixedly attached, usually by welding, to leg members 10 which form a support means for attachment to a lifting device (not shown). The lifting device typically comprises a crane or hoist or the like.

As is apparent, the continuous sheet package support surface 6 of lifting shoe 4 is of little or no use in lifting and transporting sheet packages having full-width cross runners or under-runner circumferential bands. To use a continuous one-piece lifting shoe such as shoe 4 on sheet packages having full-width cross runners or under-runner circumferential bands would result in the undesirable situations previously described with respect to such prior art devices.

Figure 2:
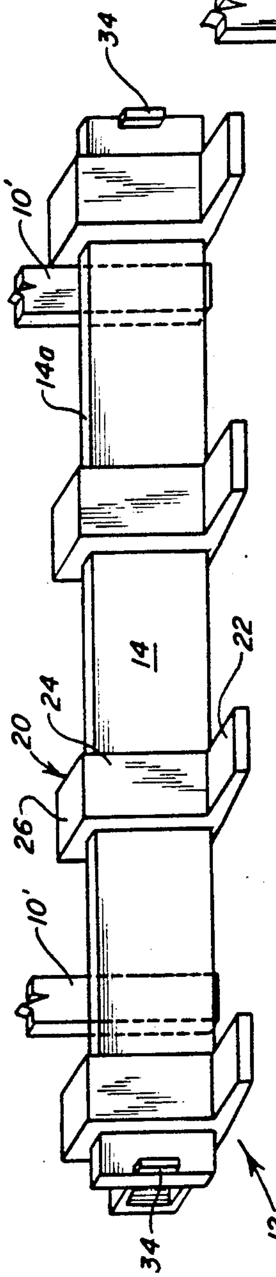
FIG. 2 is a front perspective view of the adjustable lifting shoe system of the present invention.

A sheet lifter device having an adjustable lifting shoe assembly 12 according to the present invention is illustrated in FIG. 2. The adjustable lifting shoe assembly 12 includes an elongated steel back plate or slide rail 14. Obviously, the dimensions of the back plate 14 are determined by the weight and length of the product(s) to be handled. However, typical thickness and width of the back plate 14 may be generally on the order of about ⅜" and 9", respectively, and the length of the back plate may typically vary from about 8' to about 14'. The back plate 12 is reinforced by a U-shaped steel channel member 16 welded along the full length of the rear surface of the back plate. The purpose of channel member 16 is to prevent the back plate from bending or twisting under loaded conditions. A typical channel member usable for this purpose is 14 MC 6 ship and car channel, although other channel or structural steel may be used, if desired.

Figure 3:
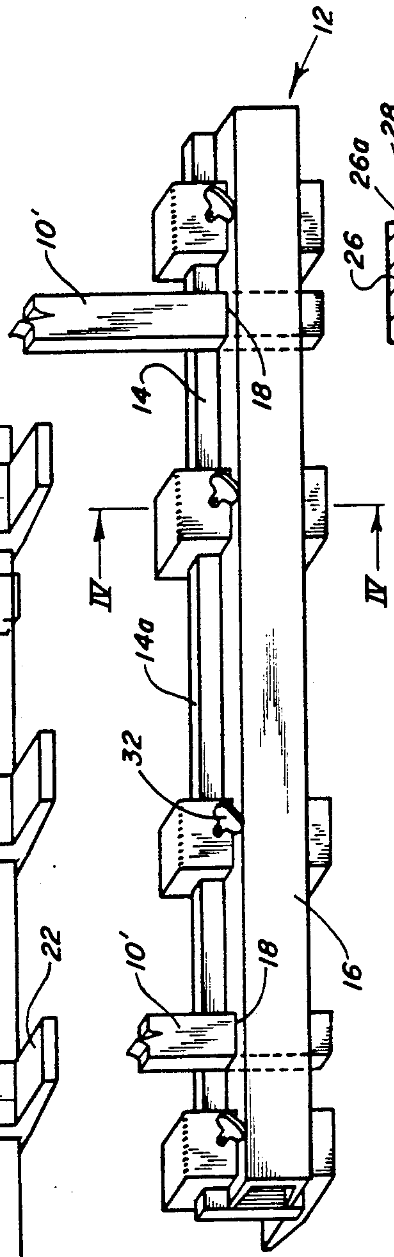
FIG. 3 is a rear perspective view of the adjustable lifting shoe system of the present invention.

The back plate 14 is fastened, preferably by welding, to legs 10' which, like legs 10 in FIG. 1, form a support means for attachment to a lifting device such as a crane or hoist. As shown in FIG. 3, channel member 16 is provided with openings 18 to accommodate legs 10'.

Figure 4:
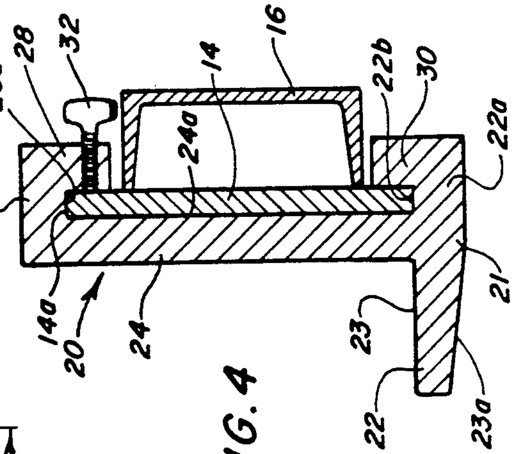
FIG. 4 is a cross-sectional view taken along lines IV—IV of FIG. 3.

Further details of the adjustable lifting shoe assembly 12 of the present invention are illustrated in FIGS. 2–4. The lifting shoe component of lifting shoe assembly 12 is formed not as a single, elongated, continuous lifting shoe like lifting shoe 4 depicted in FIG. 1, but instead, the lifting shoe component is formed as a plurality of short-length lifting shoes or forks 20. Lifting shoes or forks 20 are adapted to be slidably and adjustable supported on back plate 14 as will be described hereinbelow.

As most clearly seen in FIG. 4, each lifting shoe 20 is formed with a substantially horizontal lower region 21 having a forwardly extending sheet or sheet package lifting portion 22. The "forward" side of shoe 20 refers to the sheet or sheet package lifting side, and the "rearward" side is that side which is supported on back plate 14. The upper surface of portion 22 forms a sheet or sheet package lifting surface 23. Preferably, the lower surface 23*a* of portion 22 is chambered or tapered toward the forwardmost end of portion 22 so that portion 22 may be more easily inserted under a sheet or sheet package prior to lifting thereof. Upwardly extending from lower region 21 is a substantially vertical wall segment 24 atop which is a rearwardly extending top portion 26. Downwardly extending from the rear of the top portion 26 is flange 28. Flange 28 is spaced from a rear surface 24*a* of wall segment 24 in order to receive an upper edge portion of back plate 14 between flange 28 and wall segment 24 as will be described later.

Upwardly extending from a rearwardly extending portion 22*a*, at lower region 21, in spaced but direct opposition to flange 28, is flange 30. Flange 30 is spaced a similar distance from the rear surface 24*a* of wall segment 24 as flange 28 in order to receive a lower edge portion of backplate 14 between flange 30 and wall segment 24.

Still referring to FIG. 4, one can see that the inner surfaces of flanges 28 and 30, a section 26*a* of the undersurface of rearwardly extending top portion 26, an upper surface section 22*b* of the rearwardly extending portion 22*a* of the lower region 21, and the rear surface 24*a* of wall segment 24 provide a receiving space for back plate 14. The receiving space is, of course, slightly larger than the cross-sectional area of the back plate. The undersurface section 26*a* of the top portion 26 of each of the shoes 20 is in sliding contact with a substantially horizontal upper edge surface 14*a* of back plate 14. Thus, each of the shoes 20 are laterally slidable and adjustable relative plate 14. Furthermore, the spaced, opposed flanges 28 and 30 substantially prevent the shoes 20 from being upwardly and/or downwardly tilted relative to back plate 14. Flanges 28 and 30 thus prevent inadvertent dislodging of the shoes from the back plate 14 due to downwardly-directed sheet package weight loads and/or upwardly-directed impact loads exerted on the forwardly extending portions 22 of shoes 20. FIG. 4 further illustrates that the flanges 28 and 30 are sufficiently spaced from one another to permit channel member 16 to pass therebetween. Also, if desired, flange 28 and/or flange 30 may have clamping means 32 received therein for clamping against the rear surface of back plate 14 to temporarily fix the position of the various shoes 20 along the length of the back plate.

An illustrative, but not limitative, embodiment of the adjustable lifting shoe assembly of the present invention is shown in FIGS. 2 and 3. In this embodiment, two laterally adjustable shoes 20 are shown inwardly of legs 10' and two such shoes are shown outwardly of the leg 10' near opposite ends of back plate 14. At the outermost ends and at the front surface of the back plate there maybe provided suitable safety stop means 34. The safety stop means 34 preferably comprise steel blocks which are drilled and tapped and then bolted to each end of the back plate to prevent the outermost shoes or forks 20 from sliding or being pushed off the back plate. The safety stop means 34 can also be welded to the back plate; however, if bolted, the safety stop means can be easily removed in order to add, remove or replace one or more of the shoes 20. While four laterally adjustable shoes are illustrated FIGS. 2 and 3, it is to be understood that any suitable number of laterally adjustable shoes may be used with the present invention, depending, of course, on the size, weight and packaging arrangement of the sheet package. However, for purposes of package stability, the minimum number of shoes which should be used is two. In any event, it should now be clear that the lateral adjustability of the relatively narrow shoes 20 permits a sheet lifter constructed in accordance with the present invention to be universally adaptable to lift and transport all types of sheet packages—even those having lifting obstacles such as full-width cross runners and/or under-runner circumferential bands. The adjustable shoes of the present invention can be placed so as to straddle and/or be inserted between such lifting obstacles, regardless of their number, such that the sheets or sheet packages can be safely and sturdily lifted and transported without damage to the sheet materials or their packaging. As illustration, FIGS. 5 and 6 show end and bottom views, respectively, of opposed sheet lifter devices constructed in accordance with the present invention lifting a sheet package S having under-runner circumferential packaging bands B. As most clearly seen in FIG. 6, the shoes 20 are positioned along back plate 14 so as to straddle the bands B in order to prevent damage to the bands during lifting of the sheet package S.

The present invention is further adaptable to lift sheet materials which are palletized. The forward portions 22 of laterally adjustable shoes 20 are simply inserted between the support slats or within side slots of the pallet and the pallet can thus be lifted.

Lastly, the size, material and construction of the shoes 20 may very according to load requirements. For example, a typical shoe may be forged steel having a lifting surface 23 which measures 4" long (measured from wall segment 24 to the forwardmost and of forwardly extending portion 22) by 6" wide. But again, the lifting surface area, shoe width and thickness, and other factors are suitably selected in response to lifting capacity requirements. .

While the present invention has been described in accordance with the preferred embodiments of the various figures, it is to be understood that other similar embodiment may be used or modifications and additions may be made to the described embodiment for performing the same functions of the present invention without deviating therefrom. Therefore, the present invention should not be limited to any single embodiment but rather construed in breadth and scope in accordance with the recitation of the appended claims.

I claim:

1. A material lifting apparatus adapted to be suspended from a hoist means, said apparatus including, in combination:

first and second opposed support means positionable on opposite sides of said material for lifting and suspending said material from said hoist means, each said support means including leg means for attachment to said hoist means and a substantially horizontally extending plate secured to said leg means, said plate having substantially vertical front and rear surfaces, upper and lower substantially horizontal edge surfaces and first and second opposite ends;

a plurality of lifting shoes suspended by the plate of each of said first and second support means;

means for permitting lateral adjustment of each of said lifting shoes relative to said plate, said means for permitting lateral adjustment including a substantially horizontal surface formed on each of said lifting shoes for permitting lateral sliding of each of said shoes along said upper horizontal edge surface of said plate and a means for locking each of said shoes in desired positions along the plate; and reinforcement means comprising a "U" shaped channel member extending laterally across the rear surface of each said plate and welded through for preventing twisting of the plate under loaded conditions thereof.

2. The apparatus of claim 1 wherein each of said lifting shoes further comprise:

a substantially horizontal lower region having a forwardly extending portion and a rearwardly extending portion, said forwardly extending portion forming a sheet material lifting surface and said rearwardly extending portion having an upwardly extending flange;

a substantially vertical wall upwardly extending from said lower region at a location between said forwardly and said rearwardly extending portions thereof; and a top portion rearwardly extending from atop said substantially vertical wall, said top portion further including a downwardly extending flange, said downwardly extending flange and said upwardly extending flange each being spaced from a rear surface of said wall and in spaced but direct opposition to one another, whereby said plate is received in a space formed by inner surfaces of said upwardly and downwardly extending flanges, a section of the undersurface of said top portion, a section of the upper surface of said rearwardly extending portion of said lower region, and a rear surface of said wall.

3. The apparatus according to claim 2 further comprising stop members attached to said opposite ends of said front surface of each said plate, said stop members preventing said lifting shoes from becoming inadvertently detached from said plate.

* * * * *